US010050253B2

(12) United States Patent
Guen

(10) Patent No.: US 10,050,253 B2
(45) Date of Patent: Aug. 14, 2018

(54) RECHARGEABLE SECONDARY BATTERY HAVING A FUSE PART ON A CAP PLATE

(71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 155 days.

(21) Appl. No.: 14/970,369

(22) Filed: Dec. 15, 2015

(65) Prior Publication Data

US 2017/0018759 A1 Jan. 19, 2017

(30) Foreign Application Priority Data

Jul. 15, 2015 (KR) .................. 10-2015-0100459

(51) Int. Cl.
| H01M 2/34 | (2006.01) |
| H01M 2/22 | (2006.01) |
| H01M 2/04 | (2006.01) |
| H01M 10/04 | (2006.01) |
| H01M 2/26 | (2006.01) |
| H01M 2/30 | (2006.01) |

(52) U.S. Cl.
CPC .......... *H01M 2/348* (2013.01); *H01M 2/043* (2013.01); *H01M 2/0404* (2013.01); *H01M 2/22* (2013.01); *H01M 2/34* (2013.01); *H01M 10/0431* (2013.01); *H01M 2/26* (2013.01); *H01M 2/305* (2013.01); *H01M 2200/103* (2013.01)

(58) Field of Classification Search
None
See application file for complete search history.

(56) References Cited

U.S. PATENT DOCUMENTS

| 9,225,002 | B2* | 12/2015 | Byun ................... H01M 2/043 |
| 2004/0170887 | A1* | 9/2004 | Masumoto .......... H01M 2/0404 |
| | | | 429/61 |
| 2011/0076543 | A1 | 3/2011 | Ro |
| 2012/0148884 | A1* | 6/2012 | Kim ....................... H01M 2/06 |
| | | | 429/61 |
| 2015/0118528 | A1 | 4/2015 | Byun et al. |

FOREIGN PATENT DOCUMENTS

| EP | 2509149 A1 | 10/2012 |
| EP | 2757609 A1 | 7/2014 |
| EP | 2849263 A1 | 3/2015 |
| JP | 2014-154337 A | 8/2014 |
| KR | 10-2011-0035474 A | 4/2011 |
| KR | 10-1416520 B1 | 7/2014 |

OTHER PUBLICATIONS

EPO Extended Search Report dated Dec. 16, 2016, for corresponding European Patent Application No. 16163959.6 (6 pages).
English machine translation of Japanese Publication No. JP 2014-154337 A, dated Aug. 25, 2014, 30 pages.

* cited by examiner

*Primary Examiner* — Lucas J. O'Donnell
(74) *Attorney, Agent, or Firm* — Lewis Roca Rothgerber Christie LLP

(57) ABSTRACT

A rechargeable secondary battery includes: a case; an electrode assembly in the case; and a cap plate coupled to the case and protecting the electrode assembly, wherein the cap plate comprises a fuse part electrically connected to the electrode assembly.

10 Claims, 11 Drawing Sheets

RECHARGEABLE SECONDARY BATTERY HAVING A FUSE PART ON A CAP PLATE

CROSS-REFERENCE TO RELATED APPLICATION

This application claims priority to and the benefit of Korean Patent Application No. 10-2015-0100459 filed on Jul. 15, 2015 in the Korean Intellectual Property Office, the content of which is incorporated herein by reference in its entirety.

BACKGROUND

1. Field

Embodiments of the present invention relate to a rechargeable secondary battery.

2. Description of the Related Art

A rechargeable secondary battery is a power storage system capable of converting electrical energy into chemical energy and storing the energy with a relatively high energy density. Unlike primary batteries that are generally not recharged, secondary batteries can be repeatedly recharged and are widely used for IT devices, such as smart phones, cellular phones, notebook computers, or tablet PCs. Interest in electric vehicles has recently been increasing for preventing environmental contamination. Accordingly, high-capacity secondary batteries are employed to the electric vehicles. The secondary batteries need to meet several requirements, including high energy density, high output voltage, and stability.

The above information disclosed in this Background section is only to enhance the understanding of the background of the disclosure, and therefore it may contain information that does not constitute prior art.

SUMMARY

According to one or more embodiments of the present invention, a secondary battery includes: a case; an electrode assembly in the case; and a cap plate coupled to the case and protecting the electrode assembly, wherein the cap plate comprises a fuse part electrically connected to the electrode assembly.

The fuse part may protrude from the cap plate toward the electrode assembly.

The secondary battery may further include an insulation plate between the cap plate and the electrode assembly, wherein the fuse part passes through the insulation plate to be connected to the electrode assembly.

The secondary battery may further include a conductive plate between the insulation plate and the electrode assembly, wherein the fuse part passes through the conductive plate to be connected to the electrode assembly.

The electrode assembly may include a conductive tab extending toward the conductive plate, wherein the conductive tab is connected to the conductive plate.

The fuse part may extend from the cap plate and may be solid without a cavity inside.

The fuse part may extend from the cap plate and may be hollow with a cavity inside.

The fuse part may be formed in a widthwise direction of the cap plate.

The fuse part may be formed in a lengthwise direction of the cap plate.

The cap plate may include a terminal plate on an opposite surface of a surface having the fuse part formed thereon.

The cap plate may include a terminal fixing part constraining the terminal plate.

As described above, in the secondary battery according to some embodiments of the present invention, because a fuse part is directly formed on a cap plate, the fuse part configured to be limited to a separate current collector plate or tab may not be formed. That is to say, according to some embodiments of the present invention, because the fuse part extending and protruding toward an electrode assembly is directly formed on a bottom surface of the cap plate to then be connected to the electrode assembly, an unlimited type of fuse part cab be formed, unlike the related-art fuse part configured to be limited to a separate current collector or tab.

In addition, because a fuse part is directly formed on a cap plate, the secondary battery according to the embodiment of the present invention can easily control the thickness, width and length of the fuse part. That is to say, because the fuse part is directly formed on the cap plate, the thickness, width and length of the fuse part can be easily controlled to be suitable to the capacity or characteristic of the secondary battery.

Further, because a fuse part is directly formed on a cap plate, the secondary battery according to the embodiment of the present invention can easily form a plurality of small-area fuse parts. That is to say, because the plurality of small-area fuse parts extending from the cap plate to the electrode assembly are formed, the fuse parts may firmly fix the electrode assembly and may be operated in a secure manner.

BRIEF DESCRIPTION OF THE DRAWINGS

The above and other features of embodiments of the present invention will become more apparent by describing some details of example embodiments thereof with reference to the attached drawings in which.

DETAILED DESCRIPTION

Figure 1A:
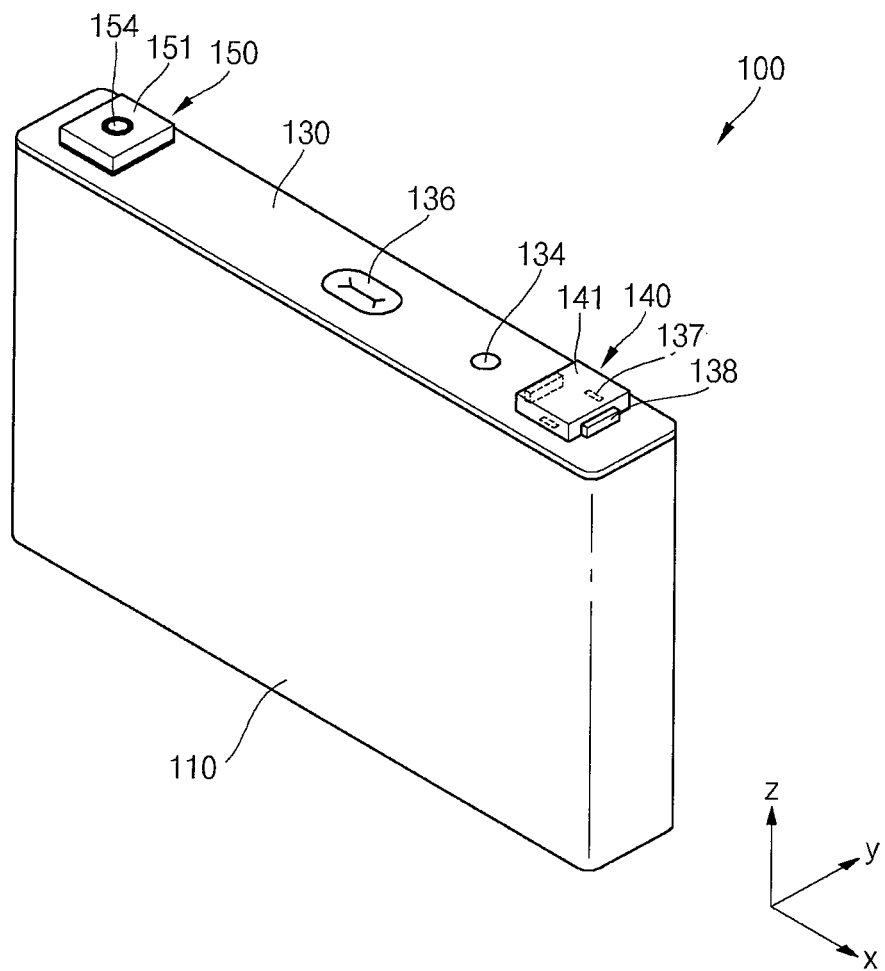
FIGS. 1A, 1B and 1C are a perspective view, a sectional view and an exploded perspective view of a secondary battery according to some embodiments of the present invention.

Hereinafter, example embodiments of the invention are described in some detail with reference to the accompanying drawings such that they can easily be made and used by those skilled in the art.

The present invention may, however, be embodied in many different forms and should not be construed as being limited to the embodiments set forth herein. Rather, these embodiments are provided so that this disclosure will be more thorough and more complete and will more fully convey the concept of the invention to those skilled in the art.

In the drawings, the thickness of layers and regions are exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

Spatially relative terms, such as "beneath", "below", "lower", "above", "upper", and the like, may be used herein for ease of description to describe one element or feature's relationship to another element(s) or feature(s) according to various processing states or use states, and may not be intended to limit the scope of the present invention. For example, if the device in the figures is turned over, elements described as "below" or "beneath" other elements or features would then be oriented "above" the other elements or features. Thus, the example term "below" can encompass both an orientation of above and below.

Additionally, it will be understood that the term "current collector tab" when used in this specification is a concept encompassing both a "positive electrode tab" and/or a "negative electrode tab." The positive electrode tab may be formed by outwardly extending directly from a positive current collector of a positive electrode plate and the negative electrode tab may be formed by outwardly extending directly from a negative current collector of a negative electrode plate. In addition, the positive electrode tab may be formed by being separately welded to a positive current collector of a positive electrode plate and outwardly extending a predetermined length and the negative electrode tab may be formed by being separately welded to a negative current collector of a negative electrode plate and outwardly extending a predetermined length. As described above, since the term "current collector tab" has complex meanings, it should not be construed as having one of the complex meanings.

Figure 1B:
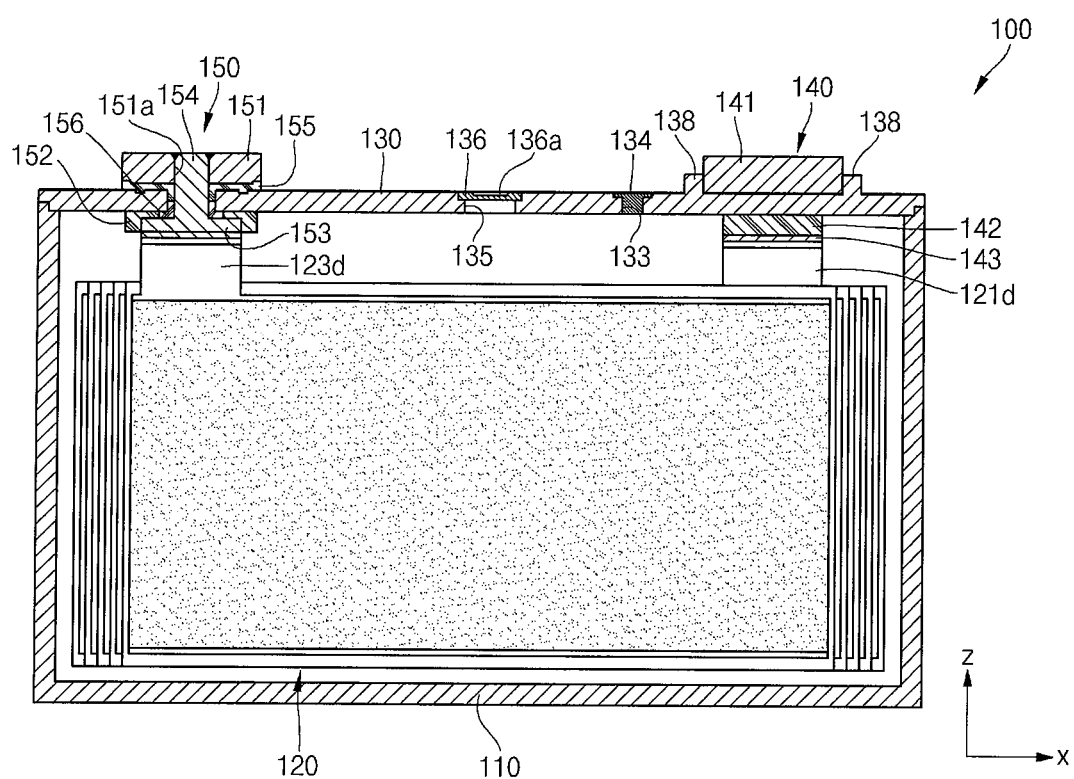
Figure 1C:
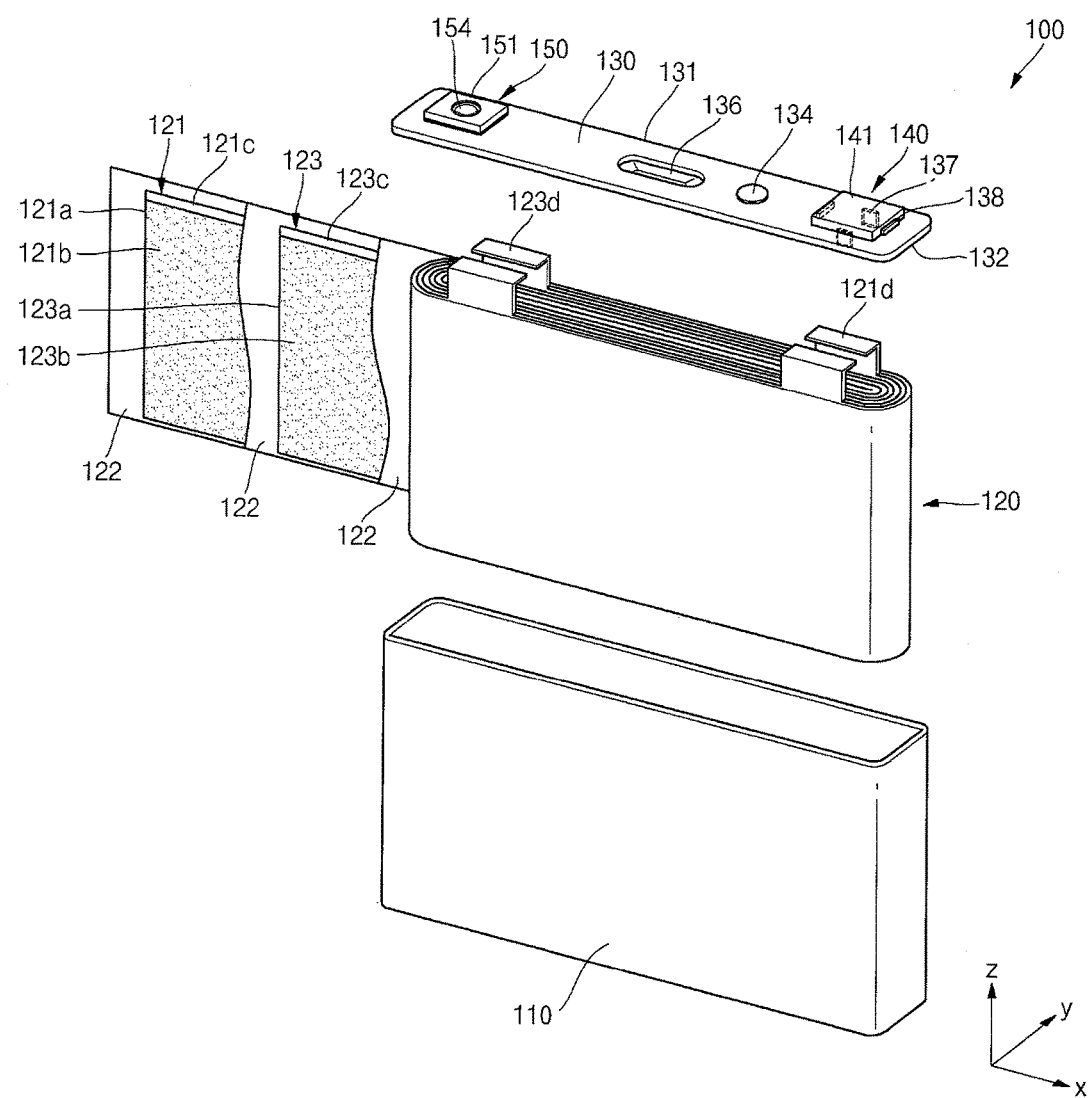
Figure 2A:
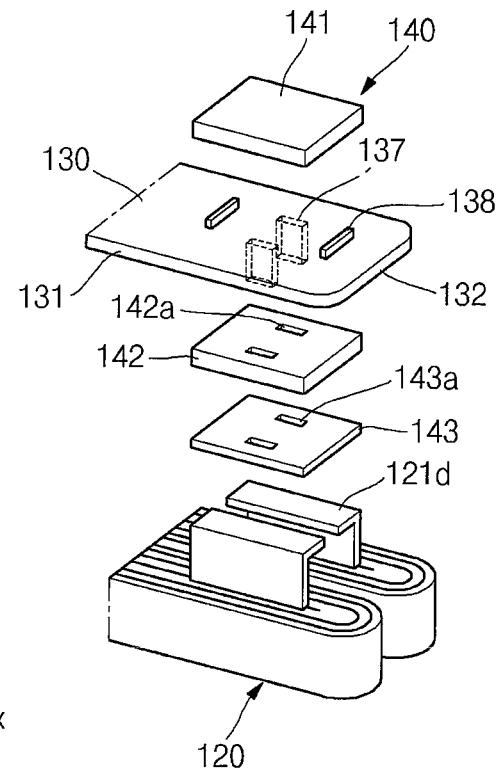
FIGS. 2A and 2B are a partially exploded perspective view and a side sectional view illustrating fuse parts and peripheral structures thereof in the secondary battery illustrated in FIG. 1
Figure 2B:
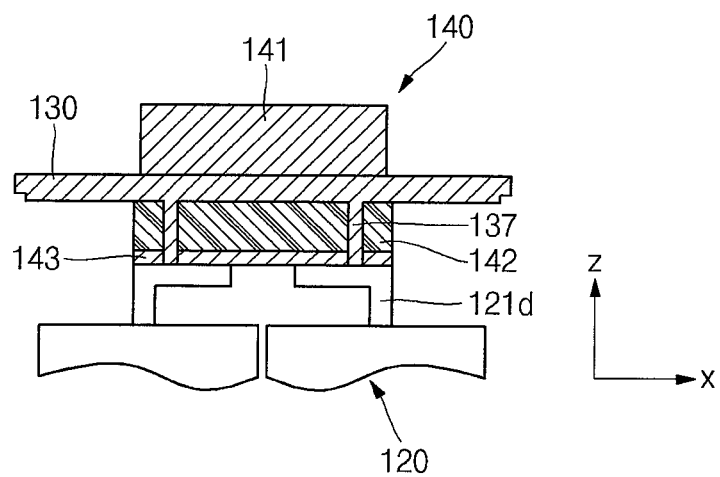

Referring to FIGS. 1A, 1B, and 1C, a perspective view, a sectional view, and an exploded perspective view of a secondary battery (100) according to some embodiments of the present invention are illustrated. Referring to FIGS. 2A and 2B, a partially exploded perspective view and a side sectional view illustrating fuse parts (137) and peripheral structures of the secondary battery 100 illustrated in FIG. 1 are illustrated, and referring to FIG. 2C, a side sectional view illustrating a state after the fuse parts (137) are operated is illustrated.

As illustrated in FIGS. 1A, 1B, 1C, 2A and 2B, the secondary battery 100 according to an embodiment of the present invention includes a case 110, an electrode assembly 120, a cap plate 130, a first terminal 140 and a second terminal 150.

The case 110 is made of a conductive metal, such as aluminum, an aluminum alloy, or nickel-plated steel, and may have a substantially hollow hexahedral shape having an opening through which the electrode assembly 120 may be accommodated. Although the opening is not illustrated in FIG. 1B, as the case 110 and the cap assembly 130 are in an assembled state, the upper portion of the cap assembly 130 substantially corresponds to the opening in the case 110. The interior surface of the case 110 is insulated, so that the case 110 is electrically insulated from the electrode assembly 120. Here, the case 110 may also be called a can in some cases.

The electrode assembly 120 may be formed by winding or laminating a stacked structure including a first electrode plate 121, a separator 122, and a second electrode plate 123. Here, the first electrode plate 121 may be a positive electrode plate and the second electrode plate 123 may be a negative electrode plate, or vice versa.

The first electrode plate 121 includes a first current collector 121a formed of a metal foil or a metal mesh, such as aluminum or an aluminum alloy, a first coating portion 121b formed by coating a first electrical active material, such as a transition metal oxide, on the first current collector 121a, a first non-coating portion (first uncoated portion) 121c, on which the first electrical active material is not coated, and a first current collector tab 121d extending from the first non-coating portion 121c to the outside (upward) to be electrically connected to the first terminal 140. Here, the first current collector tab 121d may function as a passage for current flowing between the first electrode plate 121 and the first terminal 140.

The second electrode plate 123 includes a second current collector 123a formed of a metal foil or a metal mesh, such as copper, nickel, or a nickel alloy, a second coating portion 123b formed by coating a second electrical active material, such as graphite or carbon, on the second current collector 123a, a second non-coating portion (second uncoated portion) 123c, on which the second electrical active material is not coated, and a second current collector tab 123d extending from the second non-coating portion 123c to the outside (upward) to be electrically connected to the second terminal 150. Here, the second current collector tab 123d may function as a passage for current flowing between the second electrode plate 123 and the second terminal 150.

The separator 122 may be positioned between the first electrode plate 121 and the second electrode plate 123 to prevent or reduce instances of short circuiting and to allow for the movement of lithium ions. The separator 122 may be formed of polyethylene, polypropylene, or a combined film of polypropylene and polyethylene. However, the present invention does not limit the material of the separator 122 to those disclosed herein. Rather, the separator 122 may include any suitable separator material.

Meanwhile, a winding axis of the electrode assembly 120 is substantially parallel or horizontal to terminal axes of the first and second terminals 140 and 150. Here, the winding axis and the terminal axes mean axes formed up and down in FIGS. 1B and 1C. When the winding axis and the terminal axes are referred to as being substantially parallel or horizontal to each other, it will be understood that the winding axis and the terminal axes may not meet each other even if they are stretched long or may meet each other when they are stretched very long.

In addition, as described above, the first current collector tab 121*d* is arranged or positioned between the electrode assembly 120 and the first terminal 140, and the second current collector tab 123*d* is arranged or positioned between the electrode assembly 120 and the second terminal 150. That is to say, the first current collector tab 121*d* extends from a top end of the electrode assembly 120 toward the first terminal 140 to then be connected or welded to the first terminal 140. In addition, the second current collector tab 123*d* extends from the top end of the electrode assembly 120 toward the second terminal 150 to then be connected or welded to the second terminal 150.

In a practical implementation, the first current collector tab 121*d* may correspond to the first non-coating portion 121*c* of the first electrode plate 121, on which the first electrical active material is not coated, as described above, or a separate member connected to the first non-coating portion 121*c*. Here, the separate member may be made of one selected from the group consisting of aluminum, an aluminum alloy, nickel, a nickel alloy, copper, a copper alloy and equivalents thereof.

In addition, the second current collector tab 123*d* may correspond to the second non-coating portion 123*c* of the second electrode plate 123, on which the second electrical active material is not coated, or a separate member connected to the second non-coating portion 123*c*. Here, the separate member may be made of one selected from the group consisting of nickel, a nickel alloy, copper, a copper alloy, aluminum, an aluminum alloy, and equivalents thereof.

As described above, because the winding axis of the electrode assembly 120 and the terminal axes of the first and second terminals 140 and 150 are substantially parallel or horizontal to each other, a direction in which an electrolyte is injected is also parallel or horizontal to the winding axis of the electrode assembly 120. Accordingly, when the electrolyte is injected, the electrode assembly 120 exhibits good electrolyte impregnating performance. In addition, during overcharge, internal gases of the electrode assembly 120 rapidly move to a safety vent 136, so that the safety vent 136 can be rapidly operated.

In addition, the first and second current collector tabs 121*d* and 123*d* (non-coating portions or separate members) of the electrode assembly 120 are directly electrically connected to the first and second terminals 140 and 150, shortening electrical paths, thereby reducing internal resistance of the secondary battery 100 and the number of components of the secondary battery 100.

The electrode assembly 120 and electrolyte are accommodated within the case 110. The electrolyte may include an organic solvent, e.g., ethylene carbonate (EC), propylene carbonate (PC), diethyl carbonate (DEC), ethyl methyl carbonate (EMC), or dimethyl carbonate (DMC), and a lithium salt, e.g., $LiPF_6$ or $LiBF_4$. The electrolyte may be a liquid, a solid, or a gel.

The cap plate 130 has a substantially rectangular shape with a length (e.g., a length of a long side portion 131) and a width (e.g., a width of a short side portion 132) and is coupled to the case 110. That is to say, the cap plate 130 seals the opening of the case 110 and may be made of the same material with the case 110. For example, cap plate 130 may be coupled to the case 110 by laser and/or ultrasonic welding. In some cases, the cap plate 130 may also be called a cap assembly.

The cap plate 130 includes a plug 134 closing an electrolyte injection hole 133 and a safety vent 136 closing a vent hole 135. The safety vent 136 may further include a notch 136*a* configured to be easily opened at a preset pressure.

In addition, the cap plate 130 further includes a fuse part 137 electrically connected to the first current collector tab 121*d* of the electrode assembly 120 and a terminal fixing part 138 constraining the first terminal 140. That is to say, the cap plate 130 includes at least one fuse part 137 (for example, two fuse parts as illustrated in FIGS. 1A, 1C, 2A and 2C) downwardly extending and protruding a predetermined length from the cap plate 130, and at least one terminal fixing part 138 (for example, two terminal fixing parts as illustrated in FIGS. 1A, 1C and 2A) upwardly extending and protruding a predetermined length from the cap plate 130.

Here, the at least one fuse part 137 is formed at opposite sides facing each other in a widthwise direction of the cap plate 130 (e.g., along the y-y direction), respectively, and the at least one terminal fixing part 138 is formed at opposite sides facing each other in a lengthwise direction of the cap plate 130 (e.g., along the x-x direction), respectively. The fuse part 137 and the terminal fixing part 138 of the cap plate 130 will be further described below.

The first terminal 140 includes a first terminal plate 141 positioned on a top surface of the cap plate 130, a first insulation plate 142 positioned on a bottom surface of the cap plate 130, and a first current collector plate 143 positioned on a bottom surface of the first insulation plate 142.

The first terminal plate 141 may be formed to be solid without a cavity inside and may have a substantially hexahedral shape. The first terminal plate 141 may be fixed to the top surface of the cap plate 130 through the terminal fixing part 138. To this end, the terminal fixing part 138, for example, formed at opposite sides of the first terminal plate 141 in the lengthwise direction of the cap plate 130 (e.g., along the x-x direction of the cap plate 130), may constrain left and right side surfaces of the first terminal plate 141. In addition, the terminal fixing part 138 is laser-welded or ultrasonically welded to the first terminal plate 141, thereby fixedly coupling the terminal fixing part 138 and the first terminal plate 141 to each other.

The first insulation plate 142 may have a substantially hexahedral shape and may be coupled to the fuse part 137 downwardly extending and/or protruding from the bottom surface of the cap plate 130. To this end, a fuse throughhole 142*a* is formed in the first insulation plate 142. That is to say, the fuse part 137 is formed in the widthwise direction of the cap plate 130 (e.g., along the y-y direction), the fuse throughhole 142*a* located to correspond to the fuse parts 137 is formed in the first insulation plate 142, and the fuse part 137 is coupled to the fuse throughhole 142*a*. Here, a fuse penetrating cutting groove, instead of the fuse throughhole 142*a*, may be formed.

The first current collector plate 143 may have a substantially hexahedral shape and may be coupled to the fuse parts 137. To this end, a fuse throughhole 143*a* is formed in the first insulation plate 142. That is to say, the fuse throughhole 143*a* is formed in the widthwise direction of the cap plate 130 (e.g., along the y-y direction). The fuse part 137 is fixed to the first current collector plate 143 by welding, coking or riveting, in a state in which it is coupled to the fuse throughhole 143*a* of the first current collector plate 143.

Here, a fuse penetrating cutting groove, instead of the fuse throughhole 143a, may be formed.

Additionally, the first current collector tab 121d extending from the electrode assembly 120 is connected to the first current collector plate 143. That is to say, the first current collector tab 121d is laser-welded or ultrasonically welded to the first current collector plate 143. Here, because the first current collector plate 143 and the first current collector tab 121d are both made of aluminum or an aluminum alloy, they can be easily electrically/mechanically connected to each other.

As described above, the first current collector tab 121d of the electrode assembly 120, the cap plate 130 (including the case 110) and the first terminal 140 have the same polarity. That is to say, since the first current collector tab 121d of the electrode assembly 120, the first current collector plate 143 of the first terminal 140, the fuse part 137 of the cap plate 130, the cap plate 130, and the first terminal plate 141 of the first terminal 140 are electrically connected to one another, they have the same polarity.

As described above, the cap plate 130, the fuse part 137, the first current collector plate 143 and the first terminal plate 141 may also be made of aluminum or an aluminum alloy.

When an external short circuiting occurs to the secondary battery 100, short-circuit current flows from the electrode assembly 120 to the first current collector tab 121d, the first current collector plate 143 of the first terminal 140, the fuse part 137 of the cap plate 130, the cap plate 130 and the first terminal plate 141 of the first terminal 140. Here, since the fuse part 137 has the smallest sectional area, the fuse part 137 formed in the cap plate 130 is melted and broken by the short-circuit current, thereby securing safety of the secondary battery 100. Moreover, the fuse part 137, mostly coupled to the fuse throughhole 142a of the first insulation plate 142, may not be exposed to the outside, thereby preventing a flame or an arc from affecting exterior parts of the first insulation plate 142 when the fuse part 137 is melted/broken. Therefore, even when the fuse part 137 is melted/broken, the internal space of the secondary battery 100 is maintained at a stable state.

In addition, when the secondary battery 100 is overcharged, overcharge current is supplied to the electrode assembly 120 through the first terminal plate 141 of the first terminal 140, the cap plate 130, the fuse part 137 of the cap plate 130, the first current collector plate 143 and the first current collector tab 121d. Accordingly, the fuse part 137 formed in the cap plate 130 is melted and broken, thereby securing the safety of the secondary battery 100.

Figure 2C:
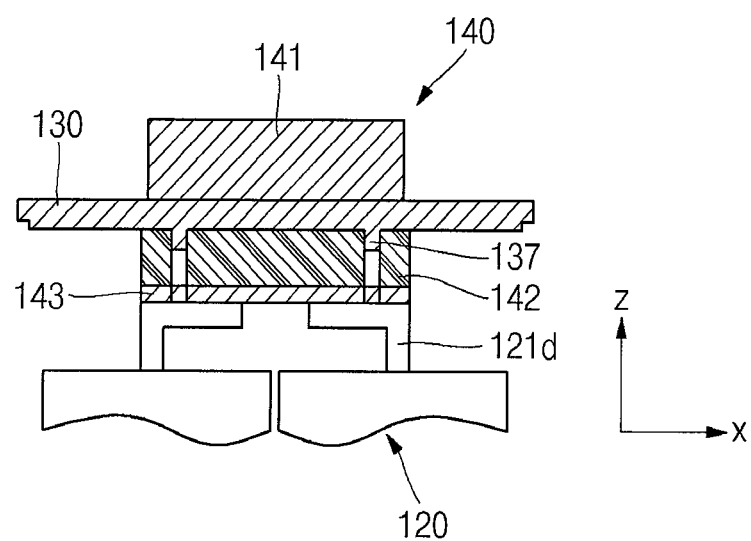
FIG. 2C is a side sectional view illustrating a state after the fuse parts are operated.

In other words, as illustrated in FIG. 2B, when the secondary battery 100 is normally charged or discharged, charge or discharge current flows through the fuse part 137. However, as illustrated in FIG. 2C, when the secondary battery 100 is abnormally charged or discharged (externally short circuited), the fuse part 137 is melted/broken, thereby cutting off the flow of current and securing the safety of the secondary battery 100.

As described above, in the secondary battery 100 according to some embodiments of the present invention, because the fuse part 137 is directly formed on the cap plate 130, a fuse part configured to be limited to a separate current collector or tab may not need to be formed. That is to say, according to some embodiments of the present invention, because the fuse part 137 extending and protruding toward the electrode assembly 120 is directly formed on a bottom surface of the cap plate 130 to then be connected to the electrode assembly 120, an unlimited type of fuse part cab be formed, unlike the conventional fuse part configured to be limited to a separate current collector or tab.

In addition, because the fuse part 137 is directly formed on the cap plate 130, the secondary battery 100 according to the embodiment of the present invention can easily control the thickness, width and length of the fuse part 136. That is to say, since the fuse part 137 is directly formed on the cap plate 130, the thickness, width and length of the fuse part 137 can be easily controlled to be suitable to the capacity or characteristic of the secondary battery 100.

Further, because the fuse part 137 is directly formed on the cap plate 130, the secondary battery 100 according to the embodiment of the present invention can easily form a plurality of small-area fuse parts 137. That is to say, because the plurality of small-area fuse parts 137 extending from the cap plate 130 to the electrode assembly 120 are formed by casting or forging, the fuse parts 137 can firmly fix the electrode assembly 120 and can be operated in a secure manner.

The second terminal 150 includes a second terminal plate 151 positioned on the top surface of the cap plate 130, a second insulation plate 152 positioned on the bottom surface of the cap plate 130, a second current collector plate 153 positioned on a bottom surface of the second insulation plate 152, and a current collector pillar 154 passing through the cap plate 130 from the second current collector plate 153 and fixed to the second terminal plate 151. In addition, the second terminal 150 includes an upper insulation plate 155 arranged or positioned between each of the second terminal plate 151 and the current collector pillar 154 and the cap plate 130. Further, the second terminal 150 includes seal gaskets 156 arranged or positioned between the second current collector plate 153 and the cap plate 130 and between the current collector pillar 154 and the cap plate 130.

In a practical implementation, the second current collector plate 153 and the second current collector pillar 154 are integrally formed, and the second current collector tab 123d is connected to the second current collector plate 153. The second current collector plate 153 and the second current collector pillar 154 are made of copper or a copper alloy. Accordingly, the second current collector tab 123d made of copper, a copper alloy, nickel or a nickel alloy is easily electrically/mechanically connected to the second current collector plate 153.

The second terminal plate 151 is also positioned on the cap plate 130 and has a hole 151a. In addition, the current collector pillar 154 is coupled and welded to the hole 151a. For example, laser beams are applied to boundary regions of the upwardly exposed current collector pillar 154 and the second terminal plate 151, thereby melting the boundary regions to then be cooled and welded to each other.

Figure 3:
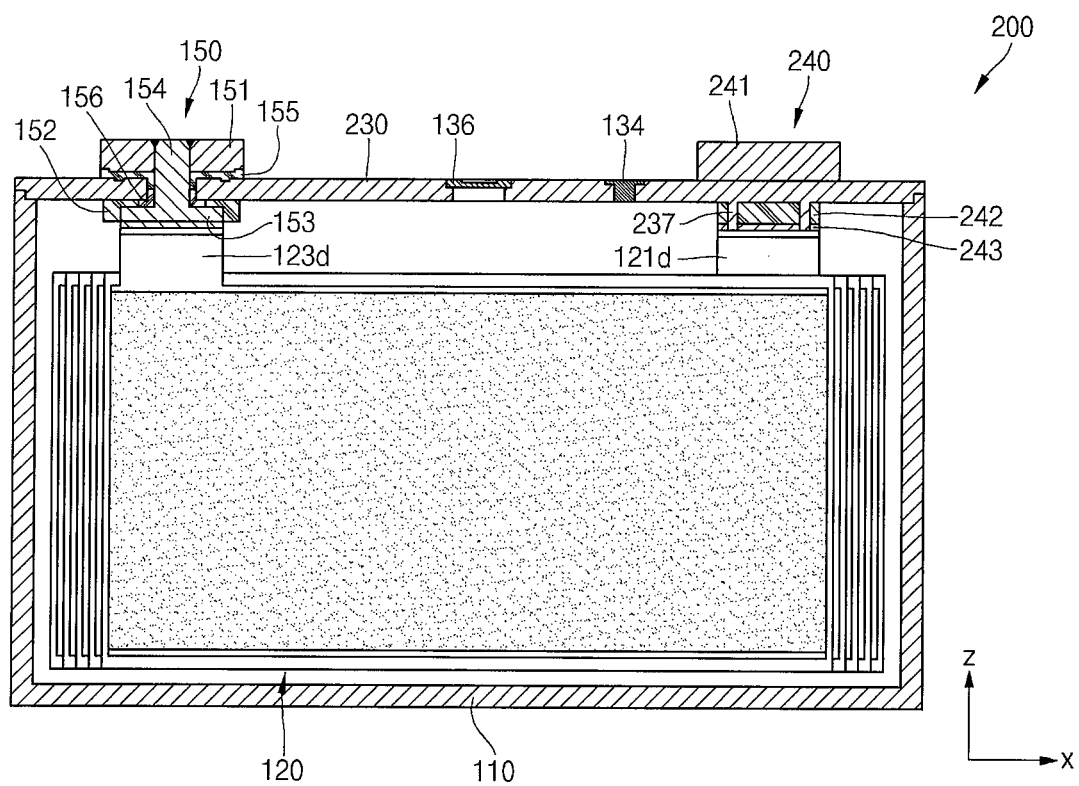
FIG. 3 is a sectional view of a secondary battery according to some embodiments of the present invention.
Figure 4A:
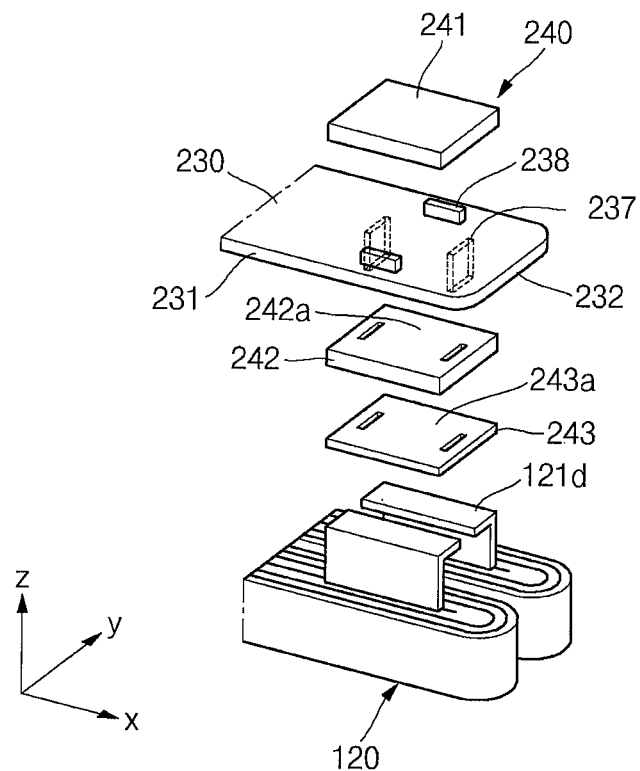
FIGS. 4A and 4B are a partially exploded perspective view and a side sectional view illustrating a fuse part and peripheral structures thereof in the secondary battery illustrated in FIG. 3
Figure 4B:
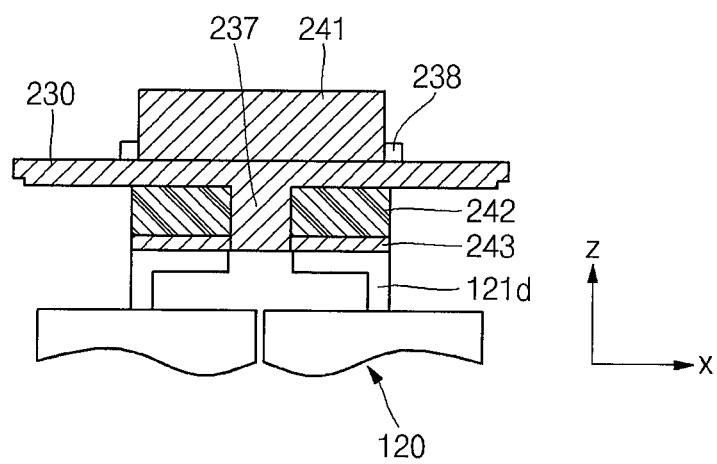

Referring to FIG. 3, a sectional view of a secondary battery (200) according to another embodiment of the present invention is illustrated. Referring to FIGS. 4A and 4B, a partially exploded perspective view and a side sectional view illustrating a fuse part (237) and peripheral structures thereof in the secondary battery (200) illustrated in FIG. 3 are illustrated, and referring to FIG. 4C, a side sectional view illustrating a state after the fuse part (237) is operated is illustrated.

As illustrated in FIGS. 3, 4A, 4B and 4C, the secondary battery 200 according to some embodiments of the present invention includes a case 110, an electrode assembly 120, a cap plate 230, a first terminal 240, and a second terminal 150.

The cap plate 230 includes a fuse part 237 electrically connected to the first current collector tab 121d of the electrode assembly 120 and a terminal fixing part 238 constraining the first terminal 240. That is to say, the cap plate 230 includes at least one fuse part 237 downwardly extending and protruding a predetermined length from the cap plate 230 and at least one terminal fixing part 238 upwardly extending and protruding a length (e.g., a predetermined length) from the cap plate 230.

Here, the fuse part 237 is formed at opposite sides facing each other in a lengthwise direction of the cap plate 230 (e.g., along the x-x direction), respectively, and the at least one terminal fixing part 238 is formed at opposite sides facing each other in a widthwise direction of the cap plate 230 (e.g., along the y-y direction), respectively. The fuse part 237 and the terminal fixing part 238 of the cap plate 230 will be further described below.

The first terminal 240 includes a first terminal plate 241 positioned on a top surface of the cap plate 230, a first insulation plate 242 positioned on a bottom surface of the cap plate 230, and a first current collector plate 243 positioned on a bottom surface of the first insulation plate 242.

The first terminal plate 241 may be formed to be solid without a cavity inside and may have a substantially hexahedral shape. The first terminal plate 241 may be fixed to the top surface of the cap plate 230 through the terminal fixing part 238. To this end, the terminal fixing part 238, for example, formed at opposite sides of the first terminal plate 241 in the widthwise direction of the cap plate 230 (e.g., along the y-y direction of the cap plate 230), may constrain front and rear side surfaces of the first terminal plate 141. In addition, the terminal fixing part 238 is laser-welded or ultrasonically welded to the first terminal plate 241, thereby fixedly coupling the terminal fixing part 238 and the first terminal plate 241 to each other.

The first insulation plate 242 may have a substantially hexahedral shape and may be coupled to the fuse part 237 downwardly extending and/or protruding from the bottom surface of the cap plate 230. To this end, a fuse throughhole 242a is formed in the first insulation plate 242. That is to say, the fuse part 237 is formed in the lengthwise direction of the cap plate 230 (e.g., along the y-y direction), the fuse throughhole 242a located to correspond to the fuse parts 237 is formed in the first insulation plate 242, and the fuse part 237 is coupled to the fuse throughhole 242a. Here, a fuse penetrating cutting groove, instead of the fuse throughhole 242a, may be formed.

The first current collector 243 may have a substantially hexahedral shape and may be coupled to the fuse parts 237. To this end, a fuse throughhole 243a is formed in the first insulation plate 142. That is to say, the fuse throughhole 243a is formed in the widthwise direction of the cap plate 230 (e.g., along the y-y direction). The fuse part 237 is fixed to the first current collector plate 243 by welding, coking or riveting, in a state in which it is coupled to the fuse throughhole 243a of the first current collector plate 243. Here, a fuse penetrating cutting groove, instead of the fuse throughhole 243a, may be formed.

Additionally, the first current collector tab 121d extending from the electrode assembly 120 is connected to the first current collector plate 143. That is to say, the first current collector tab 121d is laser-welded or ultrasonically welded to the first current collector plate 243.

As described above, the first current collector tab 121d of the electrode assembly 120, the cap plate 230 (including the case 110) and the first terminal 240 have the same polarity. That is to say, because the first current collector tab 121d of the electrode assembly 120, the first current collector plate 243 of the first terminal 240, the fuse part 237 of the cap plate 230, the cap plate 230, and the first terminal plate 241 of the first terminal 240 are electrically connected to one another, they have the same polarity.

In particular, when an external short circuiting occurs to the secondary battery 200, short-circuit current flows from the electrode assembly 120 to the first current collector tab 121d, the first current collector plate 243 of the first terminal 240, the fuse part 237 of the cap plate 230, the cap plate 230 and the first terminal plate 241 of the first terminal 240. Here, since the fuse part 237 has the smallest sectional area, the fuse part 237 formed in the cap plate 230 is melted and broken by the short-circuit current, thereby securing the safety of the secondary battery 200. Moreover, the fuse part 237, mostly coupled to the fuse throughhole 242a of the first insulation plate 242, may not be mostly exposed to the outside, thereby preventing a flame or an arc from affecting exterior parts of the first insulation plate 242 when the fuse part 237 is melted/broken. Therefore, even when the fuse part 237 is melted/broken, the internal space of the secondary battery 200 is maintained at a stable state.

In addition, when the secondary battery 200 is overcharged, overcharge current is supplied to the electrode assembly 120 through the first terminal plate 241 of the first terminal 240, the cap plate 230, the fuse part 237 of the cap plate 230, the first current collector plate 243 and the first current collector tab 121d. Accordingly, the fuse part 237 formed in the cap plate 230 is melted and broken, thereby securing the safety of the secondary battery 200.

Figure 4C:
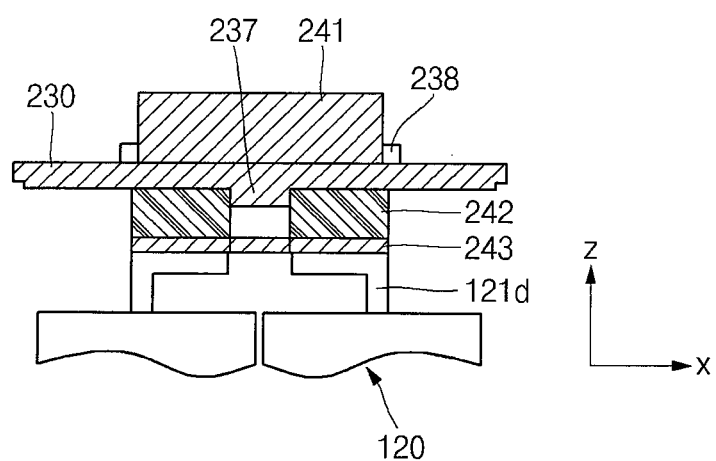
FIG. 4C is a side sectional view illustrating a state after the fuse part is operated.

In other words, as illustrated in FIG. 4B, when the secondary battery 200 is normally charged or discharged, charge or discharge current flows through the fuse part 237. However, as illustrated in FIG. 4C, when the secondary battery 200 is abnormally charged or discharged (externally short circuited), the fuse part 237 is melted/broken, thereby cutting off the flow of current and securing the safety of the secondary battery 200.

Meanwhile, although not illustrated, the fuse parts 137 and 237 may be formed in the lengthwise direction and in the widthwise direction of the cap plates 130 and 230, and the terminal fixing parts 138 and 238 may also be formed in the lengthwise direction and in the widthwise direction of the cap plates 130 and 230, respectively. Accordingly, the fuse throughholes 142a & 242a and 143a & 243a, formed on the first insulation plates 142 and 242 and the first current collector plates 143 and 243, respectively, may be positioned to correspond to the fuse parts 137 and 237, respectively.

Figure 5A:
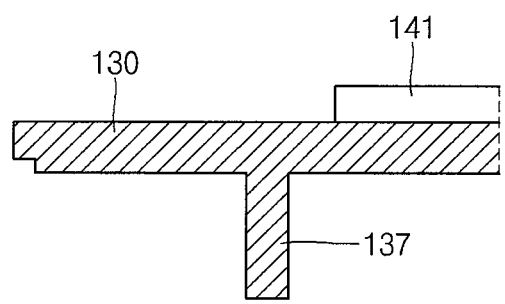
FIGS. 5A and 5B are sectional views illustrating fuse parts of a secondary battery according to some embodiments of the present invention.
Figure 5B:
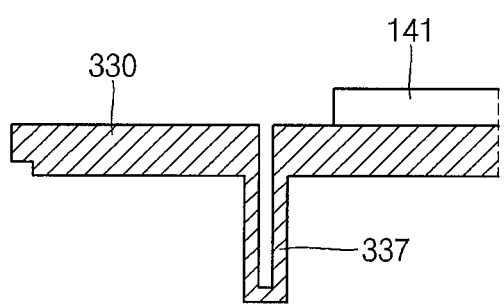

FIGS. 5A and 5B are sectional views illustrating fuse parts of a secondary battery according to some embodiments of the present invention.

As illustrated in FIG. 5A, a fuse part 137 may downwardly extend and protrude from a cap plate 130 and may be formed to be solid without a cavity inside. Alternatively, as illustrated in FIG. 5B, a fuse part 337 may downwardly extend and protrude from a cap plate 330 and may be formed to be hollow with a cavity inside.

The solid fuse part 137 may be formed by performing one of casting, forging and an equivalent thereof, on the cap plate 130. In addition, the hollow fuse part 337 may be formed by performing one of casting and an equivalent thereof on the cap plate 330.

Figure 6A:
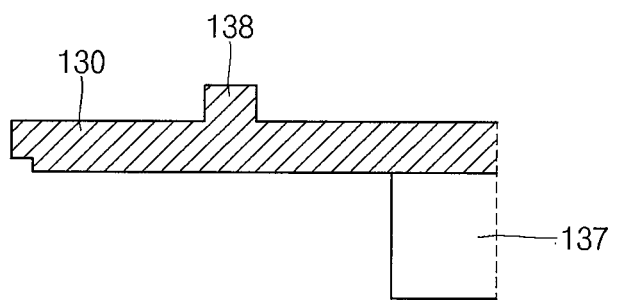
FIGS. 6A and 6B are sectional views illustrating terminal fixing parts of a secondary battery according to some embodiments of the present invention.
Figure 6B:
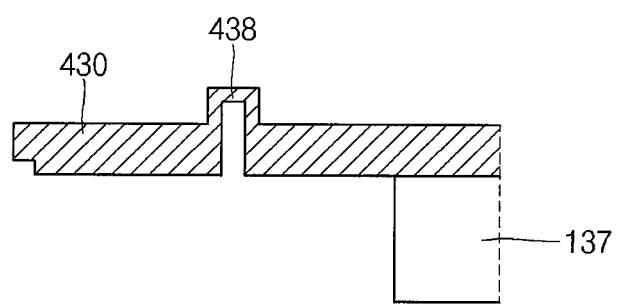

Referring to FIGS. 6A and 6B, sectional views illustrating terminal fixing parts of a secondary battery according to still another embodiment of the present invention are illustrated.

As illustrated in FIG. 6A, a terminal fixing part 138 may upwardly extend and protrude from a cap plate 130 and may be formed to be solid without a cavity inside. Alternatively, as illustrated in FIG. 6B, a terminal fixing part 438 may upwardly extend and protrude from a cap plate 430 and may be formed to be hollow with a cavity inside.

The solid terminal fixing part 138 may be formed by performing one of casting, forging and an equivalent thereof, on the cap plate 130. In addition, the hollow terminal fixing part 438 may be formed by performing one of casting and an equivalent thereof on the cap plate 430.

Figure 7:
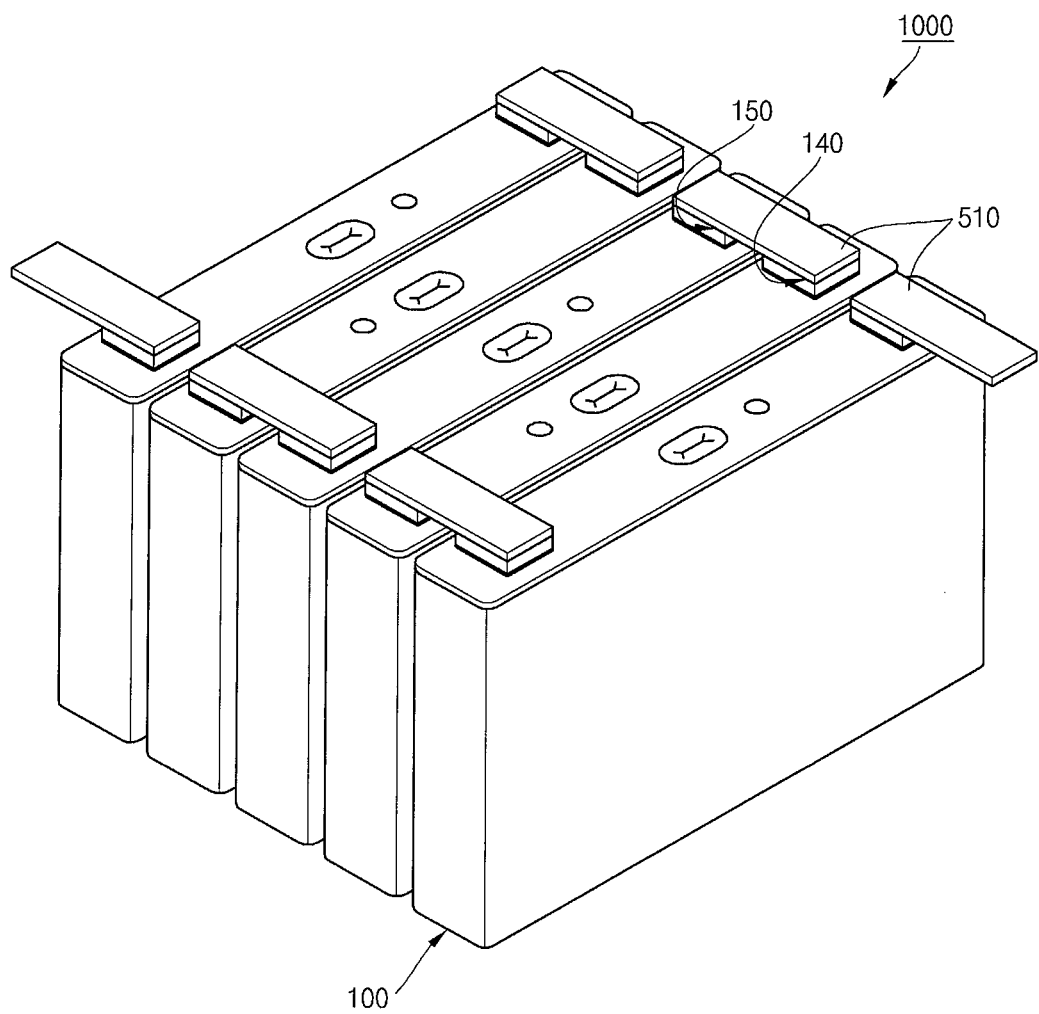
FIG. 7 is a perspective view illustrating an example of a battery module using a secondary battery according to some embodiments of the present invention.

Referring to FIG. 7, a perspective view illustrating an example of a battery module using a secondary battery according to still another embodiment of the present invention is illustrated.

As illustrated in FIG. 7, a plurality of secondary batteries 100 are arranged in a line, and a plurality of bus bars 510 are coupled to the arranged secondary batteries 100, thereby completing one battery module 1000. For example, a first terminal 140 of one of the secondary batteries 100 and a second terminal 150 of another of the secondary batteries 100, adjacent to the one secondary battery 100, are welded through the bus bars 510, thereby providing the battery module 1000 including the plurality of secondary batteries 100 connected to one another in series. Here, the bus bars 510 may be made of aluminum or an aluminum alloy. Here, the first terminal plate 141 of the first terminal 140 and the second terminal plate 151 of the second terminal 150 are also made of aluminum or an aluminum alloy, thereby easily welding the bus bars 510 to the first terminal 140 and the second terminal 150.

While the rechargeable secondary battery of the present invention has been particularly shown and described with reference to an exemplary embodiment thereof, it will be understood by those of ordinary skill in the art that various changes in form and details may be made therein without departing from the spirit and scope of the present invention as defined by the following claims, and their equivalents.

What is claimed is:

1. A secondary battery comprising:
   a case;
   an electrode assembly in the case;
   a cap plate coupled to the case and protecting the electrode assembly; and
   an insulation plate between the cap plate and the electrode assembly,
   wherein the cap plate comprises a fuse part electrically connected to the electrode assembly, the fuse part being directly formed on the cap plate and being configured to melt in response to a short-circuit current of the electrode assembly,
   wherein the fuse part passes through an opening in the insulation plate to be connected to the electrode assembly.

2. The secondary battery of claim 1, wherein the fuse part protrudes from the cap plate toward the electrode assembly.

3. The secondary battery of claim 1, further comprising a conductive plate-between the insulation plate and the electrode assembly, wherein the fuse part passes through the conductive plate to be connected to the electrode assembly.

4. The secondary battery of claim 3, wherein the electrode assembly comprises a conductive tab extending toward the conductive plate, wherein the conductive tab is connected to the conductive plate.

5. The secondary battery of claim 1, wherein the fuse part extends from the cap plate and is solid without a cavity inside.

6. The secondary battery of claim 1, wherein the fuse part extends from the cap plate and is hollow with a cavity inside.

7. The secondary battery of claim 1, wherein the fuse part is formed in a widthwise direction of the cap plate.

8. The secondary battery of claim 1, wherein the fuse part is formed in a lengthwise direction of the cap plate.

9. The secondary battery of claim 1, wherein the cap plate comprises a terminal plate on an opposite surface of a surface having the fuse part formed thereon.

10. The secondary battery of claim 9, wherein the cap plate comprises a terminal fixing part constraining the terminal plate.

* * * * *